United States Patent

Takiyama et al.

[11] Patent Number: 5,371,172
[45] Date of Patent: Dec. 6, 1994

[54] HIGH-MOLECULAR UNSATURATED POLYESTER RESIN

[75] Inventors: Eiichiro Takiyama, Kamakura; Isamu Niikura, Takasakishi; Takao Hokari, Takasaki, all of Japan

[73] Assignee: Showa Highpolymer Co., Ltd., Tokyo, Japan

[21] Appl. No.: 856,727

[22] Filed: Mar. 24, 1992

[30] Foreign Application Priority Data

Mar. 26, 1991 [JP] Japan .................. 3-062024
Mar. 26, 1991 [JP] Japan .................. 3-062046

[51] Int. Cl.$^5$ ............................. C08G 63/52
[52] U.S. Cl. ............................. 528/303; 528/272; 528/282; 528/296; 528/302; 528/306; 528/308; 528/308.6; 528/350; 528/353; 524/783
[58] Field of Search ........... 528/272, 282, 296, 302, 528/303, 306, 308, 308.6, 350, 353; 524/783

[56] References Cited

U.S. PATENT DOCUMENTS

| Re. 660 | 6/1981 | Laganis | 524/598 |
|---|---|---|---|
| 2,813,055 | 11/1957 | Nischk et al. | 525/444 |
| 4,731,422 | 3/1988 | Tanabe et al. | 525/437 |

FOREIGN PATENT DOCUMENTS 0024280 4/1981 European Pat. Off. .
53-072097 6/1978 Japan .

OTHER PUBLICATIONS

Database WPI, Week 7831, Derwent Publications Ltd. AN 78-55841A (31).

Primary Examiner—Samuel A. Acquah
Attorney, Agent, or Firm—Sughrue, Mion, Zinn, Macpeak & Seas

[57] ABSTRACT

An unsaturated alkyd having a number-average molecular weight of at least 5000 and having terminal carboxyl groups is provided by esterification and then deglycolization reaction of an $\alpha,\beta$-unsaturated polybasic acid or an polyhydroxy alcohol followed by reaction with polybasic acid anhydride to substitute more than 10 mole % of terminal hydroxyl groups with carboxyl groups. High molecular weight unsaturated polyester resin is also provided by formulating the unsaturated alkyd with a copolymerizable monomer such as styrene. The polyester resin can be widely used in a various applications by employing the excellent physical properties thereof.

8 Claims, 5 Drawing Sheets

REACTION TIME OF HIGH-MOLECULAR SATURATED POLYESTER IN REDUCED-PRESSURE AND DISTRIBUTION OF MOLECULAR WEIGHT

REACTION TIME OF HIGH-MOLECULAR SATURATED POLYESTER IN REDUCED-PRESSURE AND DISTRIBUTION OF MOLECULAR WEIGHT

WEIGHT-AVERAGE MOLECULAR WEIGHT (Mw)

REACTION TIME OF HIGH-MOLECULAR UNSATURATED ALKYD IN REDUCED-PRESSURE AND DISTRIBUTION OF MOLECULAR WEIGHT

WEIGHT-AVERAGE MOLECULAR WEIGHT(Mw)

HIGH-MOLECULAR UNSATURATED POLYESTER RESIN

BACKGROUND OF THE INVENTION

1. Field of the Invention

The present invention relates to an unsaturated alkyd having a number-average molecular weight of at least 5000, an unsaturated polyester resin obtained therefrom and a method for the preparation thereof. Particularly, the present invention relates to an unsaturated alkyd having a number average molecular weight of at least 5000 with 10 mole % or more of its terminal group consisting of a carboxyl group, an unsaturated polyester resin obtained therefrom and a method for the preparation thereof.

2. Description of the Related Art

It is generally known to dissolve an unsaturated alkyd obtained by esterifying, with polyhydroxy alcohols, an α,β-unsaturated polybasic acid or an anhydride thereof such as maleic anhydride or fumaric acid, which is used in combination with a saturated polybasic acid, an unsaturated alicyclic polybasic acid or an anhydride thereof in a monomer compolymerizable with the alkyd to form an unsaturated polyester resin.

Such unsaturated polyester resins are used for fiber-reinforced plastics (FRP), paints, casting and the like in a very wide range, and the annual output of the polyester resins has exceeded 200,000 tons.

Although unsaturated polyester resins are very important in the industrial field, the number-average molecular weight of the unsaturated alkyd which is a main component of the unsaturated polyester resins is at most about 1000 to 2500 as is common in conventional thermosetting resins and it is not an overstatement to say that there is no alkyd having a molecular weight of at least 3000.

The reason for this is that gelation makes it impossible to obtain a number-average molecular weight of the above value or more by the conventional direct esterification method using a polybasic acid or anhydride thereof and a polyhydroxy alcohol.

In some cases, attempts may be made to employ a conventional deglycol reaction, i.e., reaction at a high temperature of 250° C. or more and a highly-reduced pressure of 1 mmHg or less in the presence of a metal compound catalyst. Although the inventors attempted to synthesize a high-molecular weight unsaturated alkyd under the above conditions, the attempt was a failure due to the occurrence of inevitable gelation even when a large amount of polymerization inhibitors were added.

A thermosetting unsaturated alkyd cannot be synthesized under general conditions for synthesis of thermoplastic polyesters. It is thus obvious that there is a fundamental difference between both types of polyesters, and there are no cases where synthesis of a high-molecular unsaturated alkyd is achieved by the above method.

For example, in the case of a thermoplastic polyester, the number-average molecular weight and weight-average molecular weight decrease after the optimum time under reaction conditions has passed, as shown in FIGS. 1 and 2. Namely, this indicates that a decomposition reaction takes place. In the case of an unsaturated alkyd, the number-average molecular weight becomes constant at a value slightly lower than the highest value, as shown in FIG. 3. However, the weight-average molecular weight of the unsaturated alkyd steadily increases as shown in FIG. 4. This shows that crosslinking of the unsaturated alkyd takes place at the same time as decomposition thereof. It is clear from the above fact that the thermoplastic polyester and unsaturated alkyd are essentially different in reactions from each other.

It has been known that, in order to increase the molecular weight of these heat curable alkyds, deglycolization was carried out under reduced pressure using an organic titanium catalyst such as tetraisopropyl titanate (i.e., Japanese Patent Laid Open Nos. 3-153719, 3-220232).

In contrast to the fact that low molecular weight unsaturated alkyds synthesized by conventional esterification have balanced amounts of carboxyl groups and hydroxyl groups, in methods where molecular weight enhancing is attempted by deglycolization almost all terminal groups of the resultant higher molecular weight alkyd necessarily change to hydroxyl groups.

Of course, the unsaturated alkyds mentioned above may be used in applications where the terminal hydroxyl groups may not cause any trouble such as in casting molds. However, there are applications where at least a part of the terminal groups must be carboxyl. That is the case, for example, where molding material is produced by increasing molecular weight through the reaction of terminal carboxyl groups and divalent metal oxides or hydroxides, such as SMC (Sheet Molding Compound), BMC (Bulk Molding Compound). However, attempts to esterify the alkyd by incorporating a conventional polybasic acid are not practical as there is a fear of lowering molecular weight as a result of decomposition of the unsaturated alkyd.

The inventors have therefore achieved a method for synthesizing the unsaturated alkyds of the present invention which can satisfy the above mentioned requirements by finding that carboxylation of the terminal hydroxyl groups can be achieved without causing any degradation of molecular weight, by adding at a desired temperature a polybasic acid anhydride with or without a free carboxyl group showing no volatile or sublimating properties, and then if required, followed by further treatment under reduced pressure below 5 mmHg.

SUMMARY OF THE INVENTION

As a result of various investigations performed by the inventors, a method of obtaining an unsaturated alkyd having a number-average molecular weight of at least 5000 was found.

In one aspect of the present invention, an unsaturated alkyd having a number-average molecular weight of at least 5000 in which 10 mole % or more of the terminal hydroxyl groups are carboxylated can be provided through the following steps:

[A] preparing an unsaturated alkyd having a number average molecular weight of at least 5000 and in which the terminal groups are substantially hydroxyl groups obtained by esterification reaction of the following substances (a) and (b) to produce hydroxy polyester followed by deglycolization:

(a) acid-containing component which comprises at least 10 mol % of an α,β-unsaturated polybasic acid or an anhydride thereof relative to 100 mol % of the total polybasic acid including any saturated or non-α,β-unsaturated polybasic acid (or anhydride thereof);

(b) alcohol-containing component which comprises at least 50 mol % of a polyhydroxy alcohol having a boiling point of 300° C. or less at 760 mmHg relative to 100 mol % of the total polyhydroxy alcohol summed up, with another polyhydroxy alcohol (i.e., not defined above); and

[B] then, reacting the thus obtained unsaturated alkyd with a polybasic acid anhydride with or without free carboxyl groups.

In another aspect of the present invention, an unsaturated alkyd having a number-average molecular weight of at least 5000 in which 10 mole % or more of the terminal hydroxyl groups are carboxylated can be provided through the following steps:

[A] preparing an unsaturated alkyd having a number-average molecular weight of at least 5000 and in which the terminal groups are substantially hydroxyl groups obtained by esterification reaction of the following substances (a) and (b) to produce hydroxy polyester followed by deglycolization in the presence of an organic titanium compound catalyst added in an amount of at least 0.01 parts by weight relative to 100 parts by weight of hydroxy polyester:

(a) acid-containing component which comprises at least 10 mol % of an $\alpha,\beta$-unsaturated polybasic acid or an anhydride thereof relative to 100 mol % of the total polybasic acid including any saturated of non-$\alpha,\beta$-unsaturated polybasic acid (or anhydride thereof);

(b) alcohol-containing component which comprises at least 50 mol % of polyhydroxy alcohol having a boiling point of 300° C. or less at 760 mmHg relative to 100 mol % of the total polyhydroxy alcohol summed up with another polyhydroxy alcohol (i.e., not defined above); and

[B] then, reacting the thus obtained unsaturated alkyd with polybasic acid anhydride with or without free carboxyl groups.

In a further aspect of the present invention, an unsaturated polyester resin is provided by mixing the unsaturated alkyd obtained by the above method with a monomer copolymerizable therewith.

DETAILED DESCRIPTION OF THE INVENTION

Figure 1:
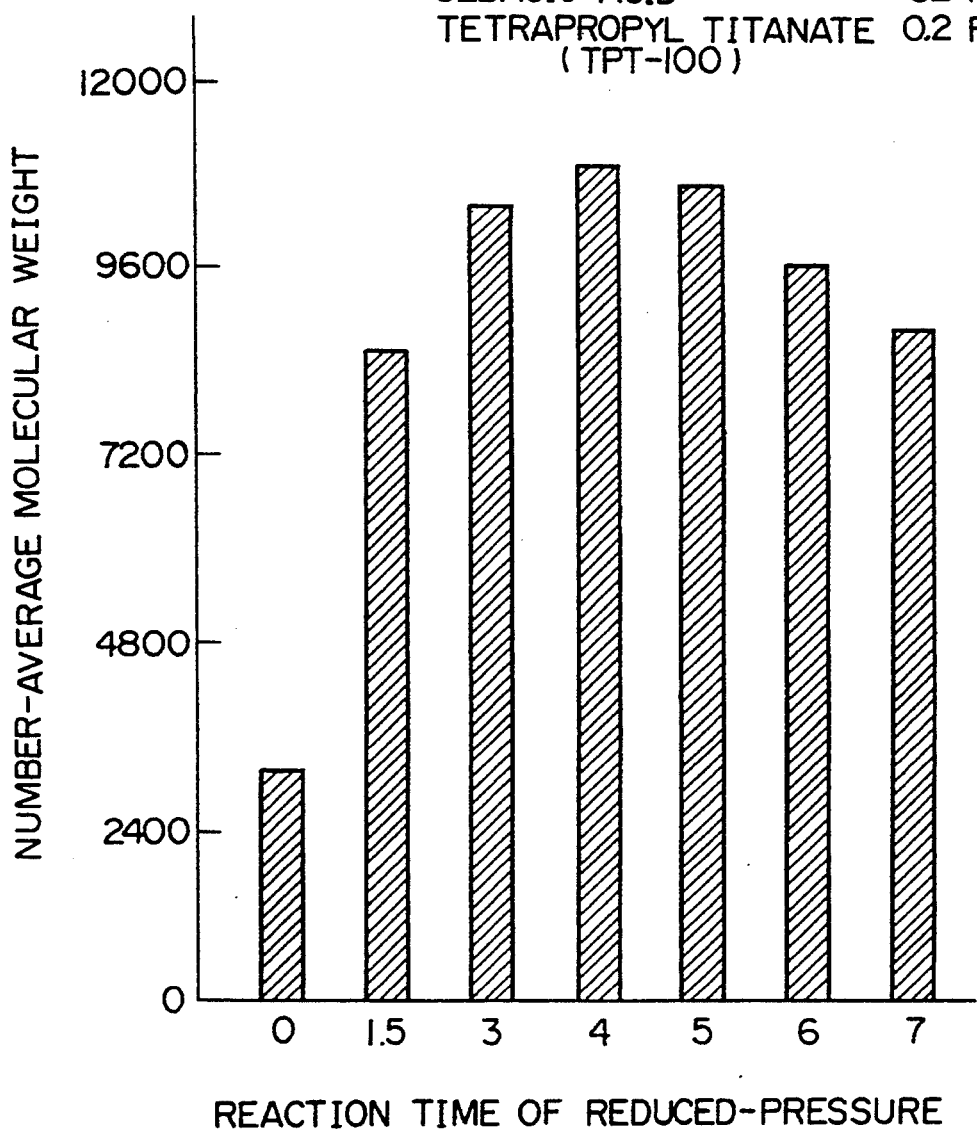
FIG. 1 shows a relation between the reduced-pressure reaction time and the number-average molecular weight distribution of a high-molecular saturated polyester.
Figure 2:
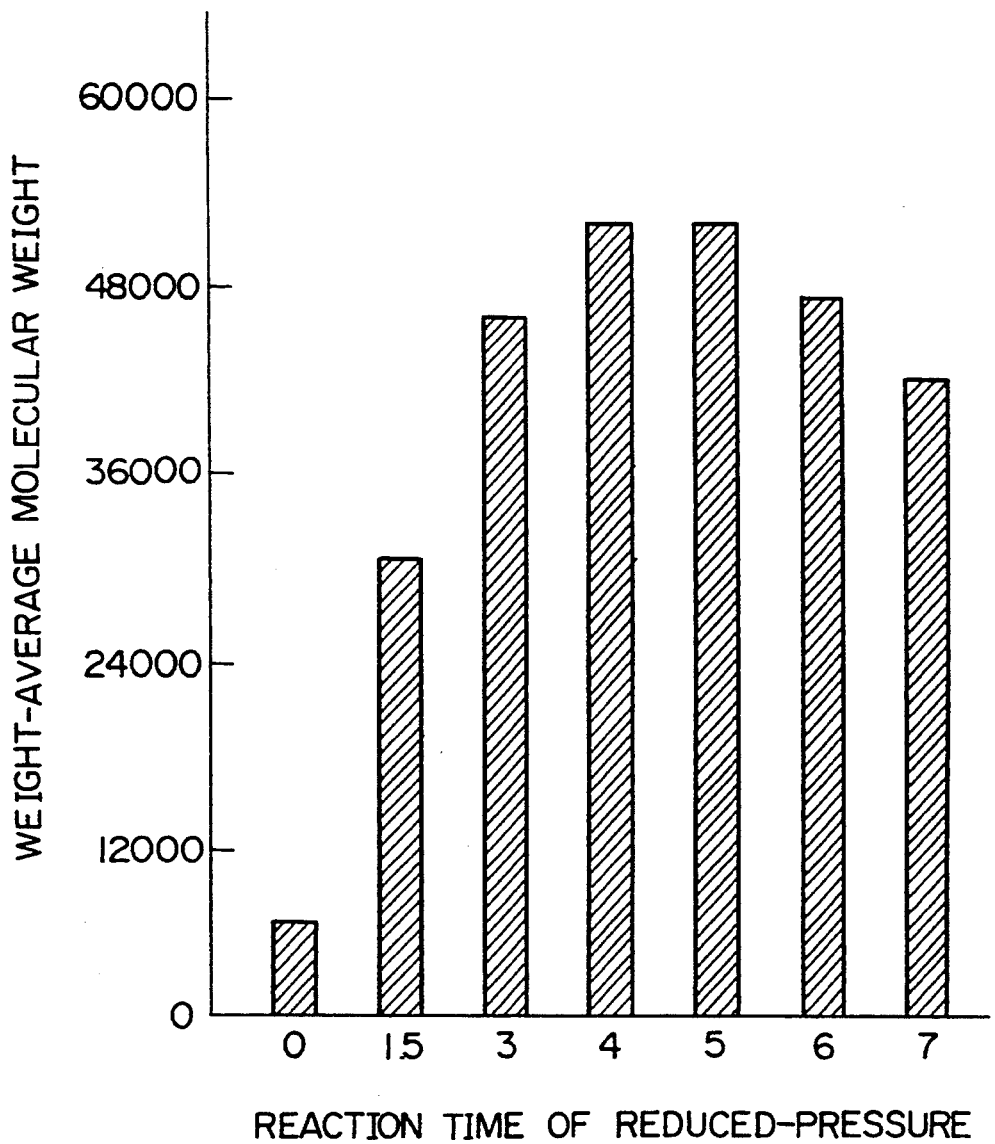
FIG. 2 shows a relation between the reduced-pressure reaction time and the weight-average molecular weight distribution of a high-molecular saturated polyester.
Figure 3:
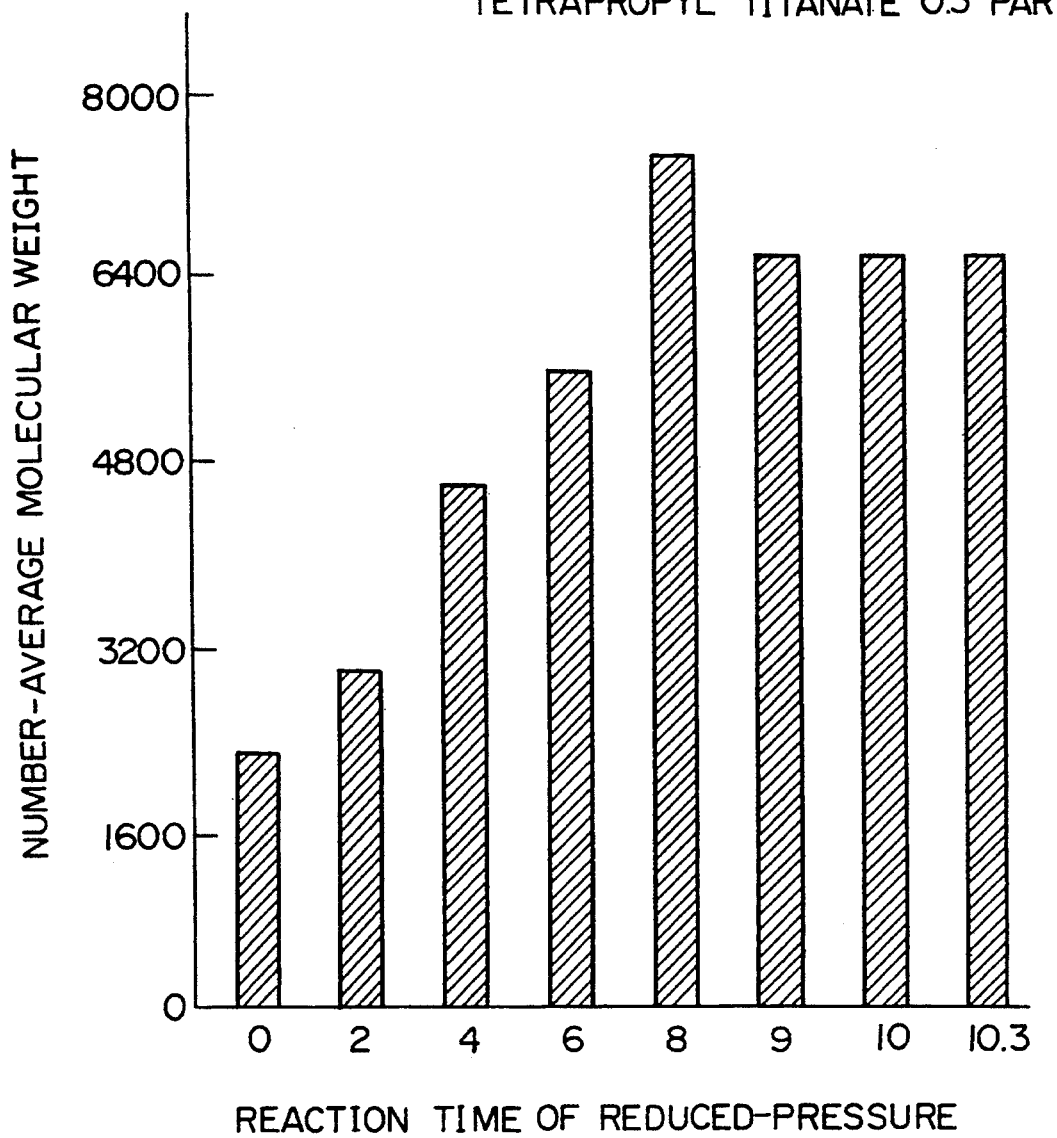
FIG. 3 shows a relation between the reduced-pressure reaction time and the number-average molecular weight distribution of a high-molecular unsaturated alkyd.
Figure 4:
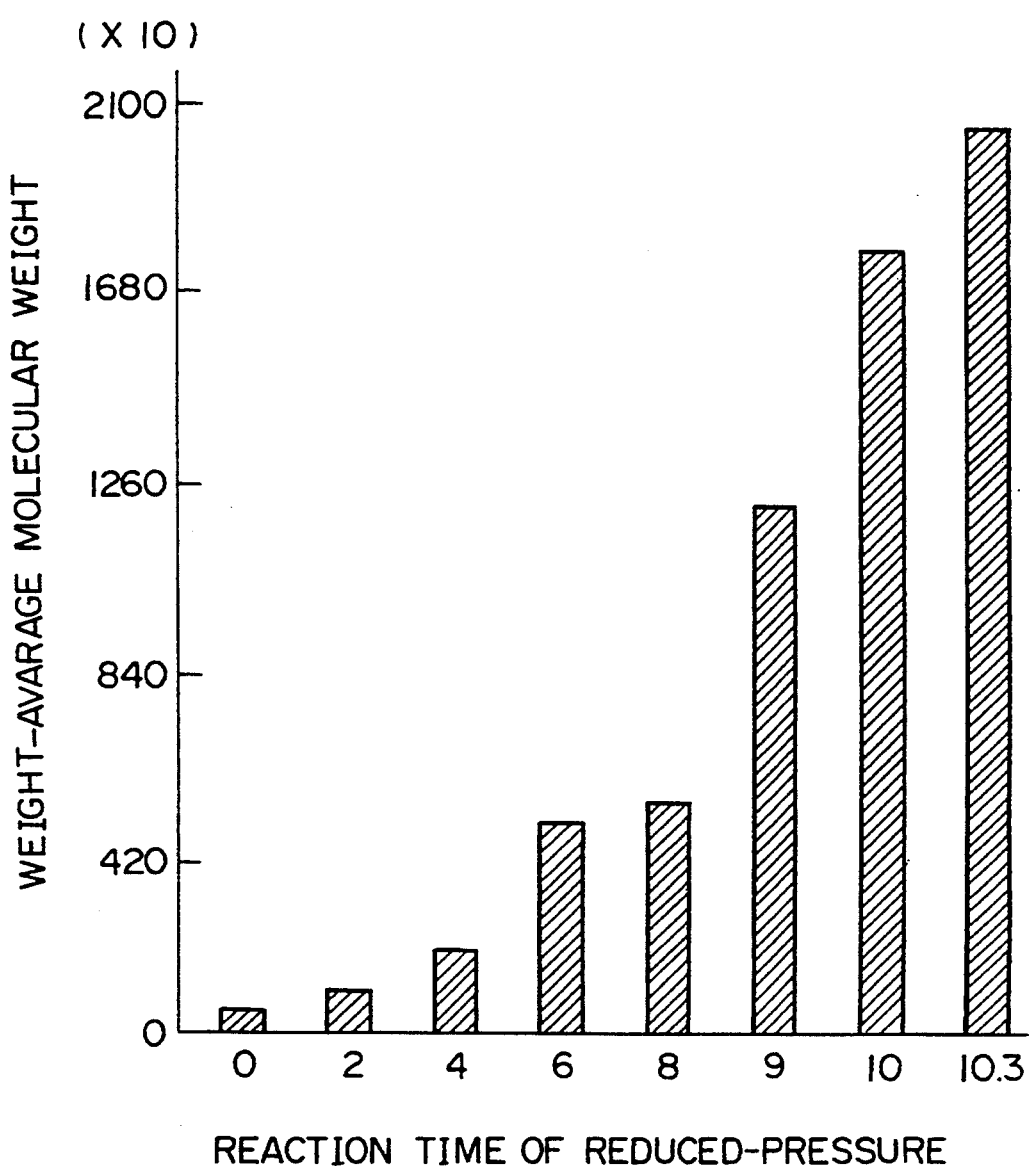
FIG. 4 shows a relation between the reduced-pressure reaction time and the weight-average molecular weight distribution of a high molecular unsaturated alkyd.

The synthesis of a high-molecular unsaturated alkyd the present invention is carried out by esterification in a first step, a deglycolization reaction in a second step and carboxylation reaction with a polybasic acid anhydride with or without a free carboxylic group in a third step.

The esterification in the first step is substantially performed for synthesizing hydroxy polyester having an acid value of 15 or less, preferably 10 or less, at a temperature of 160° to 230° C. in an inert gas flow according to normal methods. The number-average molecular weight of the resultant hydroxy polyester is preferably 500 or more.

The reasons for defining the lower limits of the $\alpha,\beta$-unsaturated polybasic acid (or anhydride thereof) in the first step to at least 10 mol % is that if the amount is less than 10 mol %, physical properties, especially the mechanical properties of the cured resin as well as curing properties deteriorate significantly, and the deterioration of the curing properties makes it difficult to completely cure the resin.

The reasons for defining the upper limits of the boiling point and lower limits of the amount of polyhydroxy alcohol are that if the amount of alcohols having higher boiling points is more than 50 mol %, the likelihood of a deglycolization reaction occurring is lowered making the enhancement of molecular weight difficult. Another polyhydroxy alcohols which have a boiling point higher than 300° C. at 760 mmHg and cannot be easily subjected to deglycolization reaction can only be used in amounts of 50 mol % or less.

The deglycolization reaction (ester exchange reaction) in the second step is performed at a highly reduced pressure of 5 mmHg or less, preferably 1 mmHg or less, in the presence of a catalyst.

If the acid value exceeds 15, the deglycolization reaction does not proceed sufficiently, and consequently the desired high-molecular unsaturated alkyd cannot be easily obtained. An organic titanium compound can be used as a catalyst. Examples of such organic titanium compounds include tetrabutyl titanate, tetrapropyl titanate and acetyl acetonate of titanium. The amount of the catalyst used is 0.01 to 0.5 parts by weight, preferably 0.1 to 0.3 parts by weight, relative to 100 parts by weight of hydroxy polyester.

The ratio of the carboxyl groups to be introduced to the high molecular unsaturated alkyd in the third step is 10 mole % or more based on the total of the terminal hydroxyl groups. In ratios lower than the above, no meaningful effect can be expected. The most preferable range naturally depends on the application though and is from 30 to 90 mole %.

Naturally, the number of terminal groups in a unit weight of a molecule differs according to molecular weight. Therefore, the "number-average molecular weight" in the present invention is defined as the number-average molecular weight measured by the GPC method (column: Showdex.No.KF-805, molecular weight at the exclusion limit: $4 \times 10^6$ as polystyrene). The amount of polybasic acid anhydride necessary to modify the alkyd is calculated with the assumption that both ends of the molecules of the alkyd are hydroxyl groups. The polybasic acid unhydride are added when the deglycolization reaction is completed. If necessary, the treatment is carried out under reduced pressure of 5 mmHg or below. Through the above treatment all or a part of the terminal hydroxyl groups can be modified without degrading molecular weight.

The materials used as polybasic acids for synthesizing the high-molecular unsaturated alkyd of the present invention are the same as those used for conventional unsaturated alkyds.

Examples of such materials used as the polybasic acids include the following:

(i) α,β-unsaturated polybasic acids and anhydrides thereof such as maleic anhydride, fumaric acid, itaconic acid and the like; and (ii) saturated or non-α,β-unsaturated polybasic acids each having a benzene nucleus, such as phthalic anhydride, isophthalic acid, terephthalic acid and dimethyl esters thereof and the like; alicyclic polybasic acids and anhydrides thereof such as tetrahydrophthalic anhydride, methyltetrahydrophthalic anhydride, hexahydrophthalic anhydride, endomethylenetetrahydrophthalic anhydride, methylendomethylenetetrahydrophthalic anhydride, HET acid and the like; aliphatic dicarboxylic acids such as succinic acid, adipic acid, azelaic acid, sebacic acid and the like.

Examples of halogen acids include HET acid, tetrachlorophthalic anhydride, tetrabromophthalic anhydride and the like.

In the present invention, glycols or alkylene monoepoxides having a boiling point of 300° C. at 760 mmHg or less are used as polyhydroxy alcohols.

Examples of such glycols include ethylene glycol, propylene glycol, diethylene glycol, dipropylene glycol, 1,3-butanediol, 1,4-butanediol, neopentyl glycol, 1,5-pentanediol, 1,6-hexanediol and the like.

Examples of such alkylene monoepoxides include ethyleneoxide, propyleneoxide, epichlorohydrin, phenyl glycidyl ether, allyl glycidyl ether and the like.

Other polyhydroxy alcohols which have a boiling point higher than 300° C. at 760 mmHg and cannot be easily subjected to glycol exchange can be used in amounts of 50 mol % or less. Examples of such polyhydroxy alcohols include hydrogenated bisphenol A, bisphenol A ethylene oxide addition products, bisphenol A propylene oxide addition products, glycerin diallyl ether, trimethylolpropane mono- or diallyl ether, nonamethylene glycol and the like.

Furthermore any alkylene monoepoxide which forms an ester bond by addition reaction with a polybasic acid and which can be deglycolized at the terminal monoester groups under the conditions of the present invention can be used.

As the polybasic acid anhydrides for modifying the alkyd, polybasic acid anhydrides with or without free carboxylic groups can be used. As the polybasic acid anhydrides having no free carboxylic group, for example, maleic anhydride, succinic anhydride, adipic anhydride, tetrahydro-phthalic anhydride, methyltetrahydro-phthalic anhydride, endomethylenetetrahydroterephthalic acid, hexahydro-phthalic anhydride, pyromellitic anhydride, etc., can be mentioned. Phthalic anhydride may be used though it is rather difficult to introduce carboxylic group quantitatively due to its sublimating property.

As the polybasic acid anhydride having free carboxylic acid, trimellitic anhydride is a preferable example.

Tetra-functional polybasic acid anhydrides such as pyromellitic anhydride have a tendency to cause gelation during use, so, it is advisable to mask a part of the anhydride group by mono-esterification when used.

When maleic anhydride is used as an anhydride of polybasic acid,

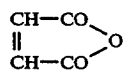

all or a part of the terminal hydroxyl group of the unsaturated alkyd are modified as shown below:

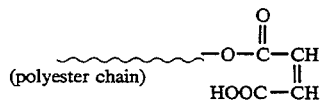

Also, hen a trimellitic anhydride is used as the modifier,

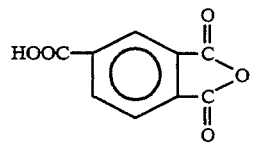

all or a part of the terminal hydroxyl group of the unsaturated alkyd are modified as shown below:

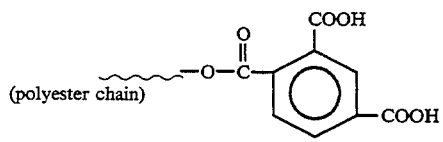

Although styrene is a typical example of a monomer copolymerizable in which the unsaturated alkyd is dissolved to form unsaturated polyester resins, vinyltoluene, methyl methacrylate, diallyl phthalate, diallylterephthalate or the like can also be used as a monomer. The amount of the monomer added is generally 20 to 300 parts by weight, preferably 50 to 200 parts by weight, relative to 100 parts by weight of unsaturated alkyd.

According to the present invention, the high-molecular unsaturated polyester resin modified with carboxyl groups at the terminal end thereof can be provided, and the resin can be applied in a variety of fields such as casting molds, paint or adhesives taking advantage of its superior mechanical and chemical properties.

The high-molecular unsaturated polyester resin of the present invention can by utilized in any field in which general unsaturated polyester resins are used. As a matter of course, fiber reinforcements, fillers, coloring agents, releasing agents and stabilizers can also be used.

EXAMPLE 1

775 g of propylene glycol and 1328 g of isophthalic acid were charged in a 3-1 separable flask with an agitator, a fractionating condenser, a thermometer and a gas inlet tube and then esterified at 180° to 190° C. to obtain an acid value of 24.1. 232 g of fumaric acid was then added to the flask, and the resultant mixture was further esterified at 200° to 210° C. to obtain an acid value of 8.7. Then 0.8 g of hydroquinone and 5 g of tetraisopropyl titanate were added to the flask, followed by deglycolization at 200° to 210° C. under pressure which was finally reduced to 0.7 mmHg, to synthesize an unsaturated alkyd having a number-average molecular weight of 8800 and an acid value of substantially zero.

After the thus-synthesized alkyd was returned to atmospheric pressure, 25 g corresponding to about 70 mol % of the terminal OH groups of the alkyd) of maleic anhydride was added to the alkyd, followed by treatment for 30 minutes under pressure reduced to 0.8 to 0.9 mmHg.

It was estimated that the product had a molecular weight of 8600, an acid value of 16 and that about 70 mol % of the terminal hydroxyl groups were carboxylated.

1000 g each of the hydroxyl terminated unsaturated alkyd which was separately synthesized and had the same composition as that of the above alkyd and a number-average molecular weight of about 8500 and the above terminal-carboxylated unsaturated alkyd was dissolved in 1000 g styrene to form a polyester resin (A) (hydroxyl terminal type) and a polyester resin (B) (70% carboxylated type).

1 part by weight of methyl ethyl ketone peroxide and 0.8 part by weight of cobalt naphthenate (6% Co) were uniformly mixed with 100 parts by weight each of both resins, and each of the resultant mixtures were then coated to a thickness of 100μ on a bonderized steel plate.

After both coating samples were allowed to stand for one night, the dryness of each of the samples was observed by finger touch. However, the results of tensile adhesion tests of the samples using an Elcometer were as follows:

| Polyester resin (A) | 25 to 30 kg/cm$^2$ |
| Polyester resin (B) | 35 to 50 kg/cm$^2$ |

These results show that the polyester resin having terminal carboxyl groups has good adhesion.

EXAMPLE 2

1 part by weight of benzoyl peroxide and 100 parts by weight of calcium carbonate fine powder were kneaded with 100 parts by weight each of the polyester resins produced in Example 1. After deaeration under reduced pressure, each of the resultant mixtures was cast molded to a plate having a thickness of 3 mm and then cured at 60° C. for 4 hours, 80° C. for 2 hours and 120° C. for 1 hour to form a molded plate. The results of bending strength tests below show differences between both polyester resins.

| Cast plate of polyester resin (A) | |
|---|---|
| Bending strength | 8.1 kg/mm$^2$ |
| Flexural elastic modulus | 610 kg/mm$^2$ |
| Cast of polyester resin (B) | |
| Bending strength | 9.7 kg/mm$^2$ |
| Flexural elastic modulus | 730 kg/mm$^2$ |

EXAMPLE 3

600 g of neopentyl glycol, 375 g of ethylene glycol, 970 g of dimethyl terephthalate and 6 g of zinc acetate were charged in a 3-1 separable flask with an agitator, a fractionating condenser, a thermometer and a gas inlet tube. Demethanolization was first progressed at 160° to 180° C. Then 292 g of adipic and 294 g of maleic anhydride were added to the reaction product when no methanol distillation was detected. The resultant mixture was then esterified at 200 to 210° C. in a stream of nitrogen to obtain an acid value of 9.8. 1 g of hydroquinone and 6 g of tetraisopropyl titanate were then added to the product, followed by deglycolization under pressure finally reduced to 0.8 mmHg.

After reaction for 5 hours, when the number-average molecular weight was 9800, the reaction was stopped. 1000 g of the thus-obtained unsaturated alkyd was then dissolved in 1000 g of styrene to obtain polyester resin (C) having substantially hydroxyl terminal groups, a Gardner color scale of 4 and viscosity of 4.9 poise.

30 g (the calculated value which allows all OH groups to be changed to COOH groups) of tetrahydrophthalic anhydride was added to the remaining unsaturated alkyd (about 1000 g), the resultant mixture was then held at 210° to 215° C. and 0.8 to 1 mmHg for 30 minutes. Although the acid value was 11, the number-average molecular weight remained almost unchanged at 9600.

1000 g of styrene was added to the thus-obtained product to obtain a polyester resin (D) having a Gardner color scale of 4 to 5 and a viscosity of 7.1 poise.

100 parts by weight of talc, 1.5 parts by weight of methyl ethyl ketone peroxide and 0.8 parts by weight of cobalt naphthenate (6% Co) were added to each of the polyester resins. The resultant resin mixture was coated on and bonded to 12 mm wide end portion of a 50×150×3 mm steel plate which had a surface polished by #1000 sand paper and then washed with 1,1,1-trichloroethane vapor.

When the tensile shearing adhesive strength of each of the samples was measured after the sample was allowed to stand at 25° C. for 48 hours, a large difference was recognized, as shown below.

| Polyester resin (C) | 55.1 to 82.9 kg/cm$^2$ |
| Polyester resin (D) | 112.0 to 151.9 kg/cm$^2$ |

EXAMPLE 4

775 g of propylene glycol and 996 g of isophthalic acid were charged in a 3-1 separable flask with an agitator, a fractionating condenser, a thermometer and a gas inlet tube, and the resultant mixture was then esterified at 185° to 195° C. in a stream of nitrogen to obtain an acid value of 24.7. 464 g of fumaric acid was then added to the product, followed by further esterification to obtain an acid value of 9.2. The number-average molecular weight was about 2000. Then, 5 g of tetraisopropyl titanate and 1 g of hydroquinone were added to the product. After the condenser was replaced by a new one, deglycolization was performed at 205° to 210° C. under pressure which was finally reduced to 0.8 mmHg to finally obtain a number-average molecular weight of 7600. It was decided that the thus-obtained unsaturated alkyd had an acid value of substantially zero and hydroxyl terminal groups.

900 g of the unsaturated alkyd was dissolved in 900 g of styrene to obtain a high-molecular weight unsaturated polyester resin (E) having terminal hydroxyl groups, a Gardner color scale of 3 and viscosity of 7.9 poise.

38 g (corresponding to about 0.8 mole per mole of terminal OH group) of trimellitic anhydride was added to the remaining unsaturated alkyd and then agitated for 30 minutes under heating at 205° to 210° C. The thus-obtained product had an acid value of 25.

The product was dissolved in 930 g of styrene to obtain terminal-carboxylated high-molecular weight unsaturated polyester resin (F) having a Gardner color scale of 4 and viscosity of 9.1 poise.

Figure 5:
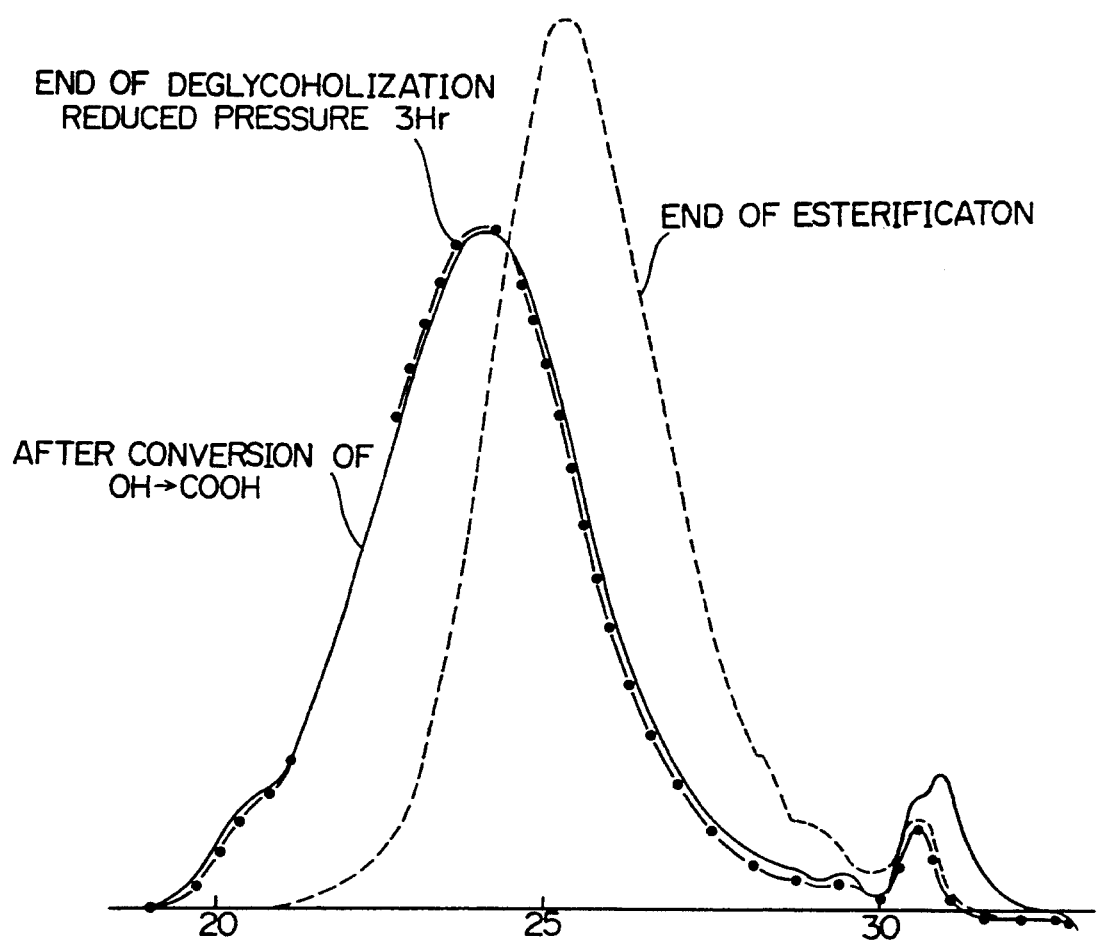
FIG. 5 shows a change in molecular weight distribution during a reaction according to Example 4.

The molecular weight distribution during this reaction is summarized in FIG. 5. It is found from FIG. 5 that the molecular weight distribution hardly changes after the terminal groups were carboxylated. The absence of a low-molecular weight region indicates that any trimellitic acid added does not remain.

100 parts by weight of calcium carbonate was added to 100 parts by weight each of the high-molecular weight unsaturated polyester resin (E) and the terminal-carboxylated high-molecular weight unsaturated polyester resin (F). Each of the resultant mixtures was then well kneaded and allowed to stand at room temperature.

The viscosity values measured after 1 week were as follows:

|  | Viscosity immediately after kneading | Viscosity after 1 week |
| --- | --- | --- |
| Polyester resin (E) | 131 poise | 159 poise |
| Polyester resin (F) | 281 poise | ≈50,000 poise |

As seen from the above results, the viscosity of the high-molecular weight unsaturated polyester resin (F) modified by an aromatic group having two carboxyl groups at the metapositions thereof in accordance with the present invention is significantly increased by adding calcium carbonate.

EXAMPLE 5

100 parts by weight of calcium carbonate and 1 parts by weight of benzoyl peroxide were kneaded with 100 parts by weight each of the unsaturated polyester resins produced in Example 1. Each of the resultant mixtures was then deaerated, cast molded to a thickness of 3 mm and cured at 60° C. for 2 hours, at 80° C. for 2 hours and at 120° C. for 2 hours to produce a cast piece. Measurement of bending strength produced the following results:

| Cast plate of polyester resin (E) | 8.9 kg/mm$^2$ |
| --- | --- |
| cast plate of polyester resin (F) | 10.8 kg/mm$^2$ |

The above results shows a difference in bending strength between both cast plates.

EXAMPLE 6

372 g of ethylene glycol, 600 g of neopentyl glycol, 776 g of dimethylterephthalate and 5 g of zinc acetate were charged in a 3-1 separable flask with an agitator, a fractionating condenser, a thermometer and a gas inlet tube. The resultant mixture was first demethanolized at 160° to 180° C. 492 g of endomethylene tetrahydrophthalic anhydride and 294 g of maleic anhydride were added to the reaction product, followed by further esterification to finally obtain an acid value of 8.7. In this stage, the number-average molecular weight was 2200. 6 g of tetraisopropyl titanate and 1 g of hydroquinone were added to the product, followed by deglycolization under pressure finally reduced to 0.8 mmHg to obtain a number-average molecular weight of 7900. The reaction product had an acid value of substantially zero.

1050 g of the thus-produced terminal hydroxyl unsaturated alkyd was dissolved in 1050 g of styrene to obtain high-molecular weight unsaturated polyester resin (G) having a gardner color scale of 4 and viscosity of 10.9 poise.

30 g (the amount which allows all terminal hydroxyl groups to be changed to carboxyl groups) of trimellitic anhydride was added to the remaining unsaturated alkyd and then held at 205° to 210° C. under pressure reduced to 1.1 mmHg for 30 minutes. The number-average molecular weight was slightly increased to 8400, and the acid value was 17.2.

The product was dissolved in 1100 g of styrene to obtain a high-molecular weight unsaturated polyester resin (H) having a gardner color scale of 5 and viscosity of 16.1 poise.

100 parts by weight of calcium carbonate, 1.5 parts by weight of methyl ethyl ketone peroxide and 0.8 part of cobalt naphthenate (6% Co) were added to 100 parts by weight each of the resins, deaerated under reduced pressure and then coated and bonded to 12 mm wide end portion of a 150×150×3 mm steel splate having a surface which was polished by #1000 sand paper and washed in 1,1,1-trichloroethane vapor to form a test piece.

After each of the test pieces were allowed to stand for 48 hours, tensile shearing adhesive strength was measured and the following results were obtained:

| Test piece of polyester resin (G) | 89.0 kg/cm$^2$ |
| --- | --- |
| Test piece of polyester resin (H) | 113 kg/cm$^2$ |

The above results show a difference in adhesive strength between both test pieces.

what is claimed is:

1. An unsaturated alkyd in which 10 mole % or more of the terminal hydroxyl groups are carboxylated, which is produced by the following steps:

(A) preparing an unsaturated alkyd having a number-average molecular weight of at least 5000 and in which the terminal groups are substantially hydroxyl groups obtained by esterification reaction of the following substances (a) and (b) to produce hydroxy polyester followed by deglycolization:

(a) acid-containing component which comprises at least 10 mol % of an α,β-unsaturated polybasic acid or an anhydride thereof relative to 100 mol % of the total polybasic acid including any saturated or non-α,β-unsaturated polybasic acid (or anhydride thereof);

(b) alcohol-containing component which comprises at least 50 mol % of a polyhydroxy alcohol having a boiling point of 300° C. or less at 760 mmHg relative to 100 mol % of the total polyhydroxy alcohol summed up with another polyhydroxy alcohol; and (B) then, reacting the thus obtained unsaturated alkyd with a polybasic acid anhydride with or without a free carboxyl group.

2. A method for producing an unsaturated alkyd in which 10 mol % or more of the terminal hydroxyl groups are carboxylated comprising the following steps:

(A) preparing an unsaturated alkyd having a number-average molecular weight of at least 5000 and in which the terminal groups are substantially hydroxyl groups obtained by esterification reaction of the following substances (a) and (b) to produce hydroxy polyester followed by deglycolization:
(a) acid-containing component which comprises at least 10 mol % of an α,β-unsaturated polybasic acid or an anhydride thereof relative to 100 mol % of the total polybasic acid including any saturated or non-α,β-unsaturated polybasic acid (or anhydride thereof);
(b) alcohol-containing component which comprises at least 50 mol % of a polyhydroxy alcohol having a boiling point of 300° C. or less at 760 mmHg relative to 100 mol % of the total polyhydroxy alcohol summed up with another polyhydroxy alcohol; and
(B) then, reacting the thus obtained unsaturated alkyd with a polybasic acid anhydride with or without a free carboxyl group.

3. An unsaturated alkyd according to claim 1, wherein a polybasic acid anhydride having no free carboxylic group is used as said polybasic acid anhydride.

4. An unsaturated alkyd according to claim 1, wherein trimellitic anhydride is used as said polybasic acid anhydride.

5. An high-molecular weight unsaturated polyester resin which is provided by formulating the unsaturated alkyd according to any of the claims 1, 2, or 3 with a monomer copolymerizable therewith.

6. A method according to claim 2, wherein polybasic acid anhydride having no free carboxylic group is used as said polybasic acid anhydride.

7. A method according to claim 2, wherein trimellitic anhydride is used as said polybasic acid anhydride.

8. A method according to any of claims 2, 6, or 7 characterized in that:
the acid value of the hydroxy polyester is 15 or less; and
the deglycolization reaction is carried out in the presence of 0.01 to 0.5 parts by weight of an organic titanium compound catalyst relative to 100 parts by weight of the hydroxy polyester under a reduced pressure of 5 mmHg or less.

* * * * *